(12) United States Patent
Betz et al.

(10) Patent No.: US 12,335,811 B2
(45) Date of Patent: Jun. 17, 2025

(54) METHOD FOR AUTHORIZING ACCESS TO A MOTOR VEHICLE BY MEANS OF A MOBILE ELECTRONIC IDENTIFICATION TRANSMITTER

(71) Applicant: MERCEDES-BENZ GROUP AG, Stuttgart (DE)

(72) Inventors: Konrad Betz, Stuttgart (DE); Matthias Reinhardt, Sindelfingen (DE); Marco Leicht, Neuhausen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 45 days.

(21) Appl. No.: 18/578,832

(22) PCT Filed: Jun. 8, 2022

(86) PCT No.: PCT/EP2022/065538
§ 371 (c)(1),
(2) Date: Jan. 12, 2024

(87) PCT Pub. No.: WO2023/285036
PCT Pub. Date: Jan. 19, 2023

(65) Prior Publication Data
US 2024/0323644 A1 Sep. 26, 2024

(30) Foreign Application Priority Data
Jul. 13, 2021 (DE) .................... 10 2021 003 616.6

(51) Int. Cl.
*H04W 4/02* (2018.01)
*B60R 25/24* (2013.01)
(Continued)

(52) U.S. Cl.
CPC ............. *H04W 4/023* (2013.01); *B60R 25/24* (2013.01); *G07C 9/00309* (2013.01);
(Continued)

(58) Field of Classification Search
None
See application file for complete search history.

(56) References Cited

U.S. PATENT DOCUMENTS

| | | | |
|---|---|---|---|
| 10,906,508 B2 | 2/2021 | Neuhoff et al. | |
| 2019/0263356 A1 | 8/2019 | Golsch et al. | |

(Continued)

FOREIGN PATENT DOCUMENTS

| | | | | |
|---|---|---|---|---|
| CA | 3239585 A1 | * | 6/2023 | ............. H02J 50/00 |
| CN | 103813004 A | * | 5/2014 | |

(Continued)

OTHER PUBLICATIONS

International Search Report and Written Opinion mailed Oct. 7, 2022 in related/corresponding International Application No. PCT/EP2022/065538.

(Continued)

*Primary Examiner* — Carlos Garcia
(74) *Attorney, Agent, or Firm* — PATENT PORTFOLIO BUILDERS PLLC

(57) ABSTRACT

A method for authorizing access to a motor vehicle involves monitoring a decrease in the signal strength of the second communication connection, while the identification transmitter is moved away from the motor vehicle, such that the spacing between the motor vehicle and the identification transmitter increase. The current signal strength of the second communication connection is stored as a reference value as soon as the first communication connection between the motor vehicle and the identification transmitter is deactivated/interrupted. The first communication connection is reactivated as soon as the signal strength of the second communication connection exceeds the stored reference value due to the decreasing spacing between the motor vehicle and identification transmitter when the iden- (Continued)

tification transmitter is moved towards the motor vehicle again.

10 Claims, 1 Drawing Sheet

(51) Int. Cl.
    *G07C 9/00*           (2020.01)
    *H04W 12/08*        (2021.01)

(52) U.S. Cl.
    CPC .. *H04W 12/08* (2013.01); *G07C 2009/00357* (2013.01); *G07C 2209/63* (2013.01)

(56) References Cited

U.S. PATENT DOCUMENTS

| | | | |
|---|---|---|---|
| 2020/0198580 A1 | 6/2020 | Saleh et al. | |
| 2021/0179014 A1 | 6/2021 | Hasegawa et al. | |
| 2024/0361821 A1* | 10/2024 | Yen | G06F 1/3215 |

FOREIGN PATENT DOCUMENTS

| | | |
|---|---|---|
| CN | 112996109 A | 6/2021 |
| DE | 102017103187 A1 | 8/2017 |

OTHER PUBLICATIONS

Office Action created Feb. 1, 2022 in related/corresponding DE Application No. 10 2021 003 616.6.

\* cited by examiner

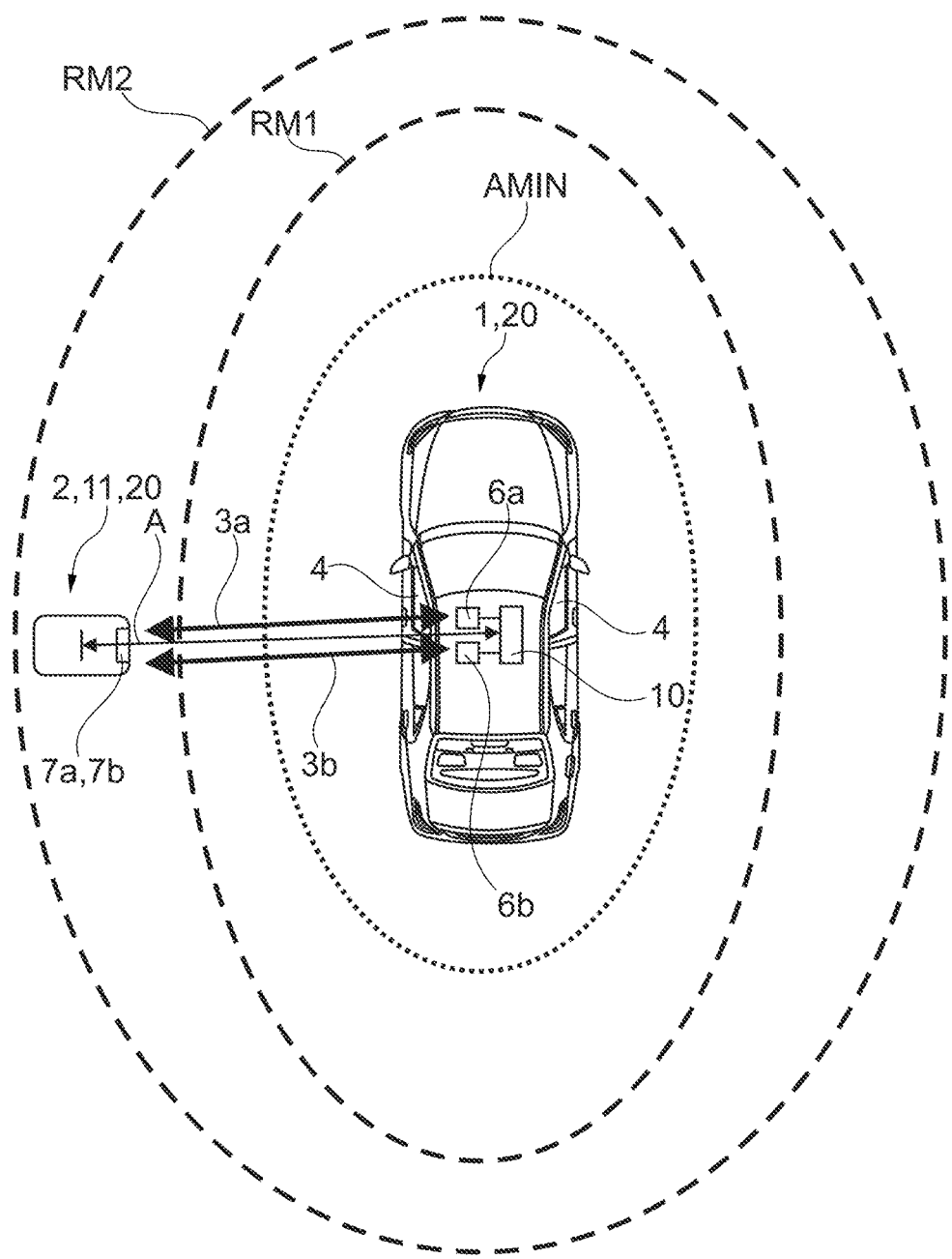

METHOD FOR AUTHORIZING ACCESS TO A MOTOR VEHICLE BY MEANS OF A MOBILE ELECTRONIC IDENTIFICATION TRANSMITTER

BACKGROUND AND SUMMARY OF THE INVENTION

Exemplary embodiments of the invention relate to a method for authorizing access to a motor vehicle by means of a mobile electronic identification transmitter and to an arrangement consisting of a motor vehicle and an identification transmitter, which is equipped/programmed to carry out this method.

Mobile electronic identification transmitters are used to enable the authorization to access a motor vehicle as an alternative to a mechanical vehicle key. In general, radio systems are used in the low-frequency range in order for the identification transmitter to communicate with the motor vehicle. Authentication data can thus be wirelessly transmitted. The use of a radio connection according to the so-called UWB standard is known in this context. By means of such a communication connection according to the UWB standard, it is only possible to transmit data between the identification transmitter and the motor vehicle. Such a UWB connection also makes it possible to determine a current spacing between the identification transmitter and the motor vehicle with a relatively high precision, and to transmit the spacing to the motor vehicle.

For this purpose, methods such as the "ping pong" method or the so-called "polling" method can be used. These methods are based on determining the signal transmission duration required for signals transmitted between the identification transmitter and the motor vehicle, and on calculating the desired spacing between the motor vehicle and the identification transmitter from this transmission duration.

A disadvantage of such a UWB connection, however, is the relatively high electric power it requires at a relatively low range.

In this context, it is known from conventional motor vehicles, access to which can be authorized with mobile identification transmitters, to implement the wireless transmission of authorization information by means of a further radio connection according to the so-called BLE standard ("Bluetooth Low Energy standard") in addition to the UWB connection. In comparison with a communication connection according to the UWB standard, a communication connection according to the BLE standard has the advantage of a greater range while simultaneously requiring less electrical power. However, unlike the UWB connection, the BLE connection does not allow the position or spacing of the identification transmitter relative to the motor vehicle to be precisely determined.

These properties of the BLE connection are taken advantage of in the authorization method described in US 2019 0263356 A1. Accordingly, when the identification transmitter nears the motor vehicle, the UWB communication connection is activated using the BTE communication connection. For this purpose, the signal strength of the BLE connection between the motor vehicle and the identification transmitter is evaluated, and when a particular threshold value of the signal strength is exceeded, the UWB connection is activated. By means of the UWB connection, the spacing between the motor vehicle and the identification transmitter is then calculated, such then when a particular minimum spacing is fallen short of, particular actions can be triggered in the motor vehicle.

In practice, however, it proves problematic to determine a suitable reference value of the signal strength of the BLE connection in this method, because this signal strength can be highly dependent on a plurality of different environmental conditions.

Exemplary embodiments of the present invention are accordingly directed to an improved method for authorizing access to a motor vehicle by means of a mobile electronic identification transmitter, the method accounting for the issues explained in the above.

The principle of the invention is accordingly to monitor the decrease of the signal strength of the BLE connection while the identification transmitter is moved away from the motor vehicle, and to store the current measured signal strength as a reference value if the UWB connection exceeds the maximum range such that the UWB connection is interrupted, and thus deactivated. Due to its greater range, the BLE connection remains active.

If, at a later point in time, the identification transmitter nears the motor vehicle again, the BLE connection, which has a longer range, then initially becomes active, such that the signal strength of the BLE connection—which is increasing due to the reducing spacing of the identification transmitter from the motor vehicle—can be monitored. If the signal strength reaches or exceeds the previously stored reference value, the first communication connection, and thus the UWB connection, is activated again, such that the current spacing between the identification transmitter and the motor vehicle can be determined by means of the UWB connection as part of the authorization process.

The method according to the invention serves to authorize access to a motor vehicle by means of a mobile electronic identification transmitter, which motor vehicle can be unlocked by means of this identification transmitter. The identification transmitter is connected to the motor vehicle in a data-transmitting manner or such that it can transmit data both by means of a first wireless communication connection, which works with the UWB standard, and by means of a second wireless communication connected, which works with the BLE standard. The first wireless communication connection is designed such that a current spacing between the identification transmitter and the motor vehicle can be determined with the first wireless communication connection. For this purpose, current methods that are known to the appropriate person skilled in the art, such as so-called "ping pong" methods or a so-called polling method, can be used. These methods are based on the fact that by determining the signal propagation time of a signal that has been transmitted from the identification transmitter to the motor vehicle, or vice versa from the motor vehicle to the identification transmitter, a current spacing between the identification transmitter and the vehicle is calculated.

A maximum range of the first communication connection measured from the motor vehicle is shorter than a maximum range of the second communication connection that is also measured from the motor vehicle.

The method according to the invention comprises three measurements a), b) and c). According to measurement a), a decrease in the signal strength of the second communication connection is monitored, preferably by the motor vehicle, while the identification transmitter is moved away from the motor vehicle, such that a spacing between the motor vehicle and the identification transmitter increases. In practice, this is the case if the person who is carrying the identification transmitter—and thus the driver of the motor vehicle—has left the vehicle after parking it, and moves away from the motor vehicle. The signal strength can be monitored in the motor vehicle or in the identification transmitter. According to a further measurement b), the current signal strength of the second communication connection is stored as a reference value as soon as the first communication connection between the motor vehicle and the identification transmitter is deactivated or interrupted. This is typically the case if the spacing between the motor vehicle and the identification transmitter has exceeded the maximum range of the first communication connection. Due to the greater maximum range of the second communication connection, the latter is typically maintained at the point in time at which the first communication connection is deactivated or interrupted, such that the signal strength of the second communication connection can be measured without issue at this point in time.

If the identification transmitter is moved towards the motor vehicle again at a later point in time—this is typically the case if the driver of the parked motor vehicle would like to drive away with the motor vehicle—then according to the invention, the deactivated first communication connection is activated again as soon as the signal strength of the second communication connection exceeds the stored reference value due to the decreasing spacing between the motor vehicle and the identification transmitter when the identification transmitter is moved towards the motor vehicle again. If the reference value is exceeded in this way, this signals that the identification transmitter is located in range of the first communication connection, such that the first communication connection is available again to determine the spacing between the motor vehicle and the identification transmitter as part of the access authorization to the motor vehicle.

The first communication connection is expediently deactivated if the maximum range of the first communication connection is exceeded when the identification transmitter is moving away from the motor vehicle. It is also conceivable, however, that the first communication connection is already deactivated at an earlier point in time, for example due to a very high electrical power consumption of the identification transmitter, which is required so that the first communication connection can be operated. To prevent an electrical energy storage device—typically a re-chargeable electric battery—that is present in the identification transmitter from being completely discharged, it can thus be logical to deactivate the first communication connection in advance before its maximum range has been reached. Even in this case, however, the method can be followed according to the measurement b) and c).

Particularly preferably, after the reactivation of the first communication connection carried out in measurement c), in a measurement d) following measurement c), the current spacing between the identification transmitter and the motor vehicle is determined by means of the first communication connection as part of the authorization of access to the motor vehicle for the person carrying the identification transmitter. This makes it possible to trigger different actions in the motor vehicle depending on the determined spacing.

According to an advantageous development, authorization data can be transmitted from the identification transmitter to the motor vehicle by means of the second communication connection as soon as the spacing determined in measurement d) falls short of a pre-determined minimum value.

Particularly preferably, a pre-determined action can thus be carried out in or on the motor vehicle as soon as the spacing determined in measurement d) falls short or has fallen short of a pre-determined minimum value. In developments of this variant, two or more such actions can also be carried out, wherein it is conceivable that an individual minimum value of the spacing is assigned to every single action. Various possible embodiments thus result.

Particularly preferably, the pre-determined action can comprise or be the unlocking of at least one vehicle door of the motor vehicle. This leads to a clear increase in comfort if the person carrying the identification transmitter with them would like to get into the motor vehicle which is still locked, because the vehicle can thus be unlocked automatically such that it increase convenience before the person has reached the vehicle door of the motor vehicle.

In measurement b), the reference value can be expediently established by averaging the signal strength over a pre-determined period of time. This can prove advantageous for compensating for temporally or spatially local fluctuations in the measured signal strength in the manner of a low-pass filter.

For this pre-determined period of time, a value for the pre-determined period of time which is for example between 1 second and 5 seconds, for example of approximately 4.5 seconds, has proved particularly advantageous.

Particularly preferably, the electronic identification transmitter can be part of a smartphone. Because a modern smartphone is often already designed to transmit data both by means of the BLE standard and by means of the UWB standard, a commercially available smartphone can thus be used without expanding its hardware to carry out the method according to the invention.

The invention further relates to an arrangement comprising a motor vehicle and comprising a mobile electronic identification transmitter, which communicates or can communicate with the motor vehicle by means of a first wireless communication connection according to the UWB standard and by means of a second wireless communication connection according to the BLE standard.

The first wireless communication connection is designed such that a current spacing between the identification transmitter and the motor vehicle can be determined with the first wireless communication connection. For this purpose, current methods, for example the so-called polling method, can be used. This method is based on the fact that by determining the signal propagation time of a signal that has been sent from the identification transmitter to the motor vehicle, or vice versa from the motor vehicle to the identification transmitter, the current spacing between the identification transmitter and the motor vehicle is calculated. The arrangement further comprises a control/regulation device that is present in the motor vehicle and that is equipped/programmed to carry out the method according to the invention explained above. The advantages of the method according to the invention explained above thus also apply to the arrangement according to the invention.

According to a preferred embodiment of the arrangement, the electronic identification transmitter is part of a smartphone or formed by such a smartphone. Because a modern smartphone is often designed to transmit data both by means of the BLE standard and by means of the UWB standard, a commercially available smartphone can thus be used without expanding the hardware to carry out the method according to the invention.

Further important features and advantages of the invention result from the sub-claims, from the drawings and from the associated description of FIGURES with reference to the drawing.

Naturally, the features specified above and which remain to be explained in the following can be used not only in the respectively specified combination, but also in other combinations or in isolation, without leaving the scope of the present invention.

BRIEF DESCRIPTION OF THE SOLE DRAWING

Preferred exemplary embodiments of the invention are represented in the sole drawing and are explained in more detail in the following description, wherein identical reference signs relate to identical or similar or functionally identical components.

DETAILED DESCRIPTION

The sole FIGURE illustrates an example of an arrangement 20 according to the invention in an aerial view. The arrangement 20 comprises a motor vehicle 1 with vehicle doors 4, via which access into a vehicle interior of the motor vehicle 1 is possible. The motor vehicle 1 comprises a control/regulation device 10, which is equipped/programmed to carry out the method according to the invention. The control/regulation device 10 can be a control device connected to a field bus present in the motor vehicle 1, e.g., an LIN or CAN bus. The arrangement 20 further comprises a mobile electronic identification transmitter 2. The electronic identification transmitter 2 can be part of a smartphone 11 or be formed by a smartphone 11. The identification transmitter 2 enables an automatic authorization of access to the motor vehicle 1 while the identification transmitter 2 nears the motor vehicle 1.

The mobile electronic identification transmitter 2 can communicate with the control/regulation device 10 of the motor vehicle 1 by means of a first wireless communication connection 3a according to the UWB standard and by means of a second wireless communication connection 3b according to the BLE standard. For this purpose, provision can be made in the motor vehicle 1 for a corresponding first transmission and reception device 6a that is connected to the control/regulation device 10 in a data-transmitting manner and which can communicate in a data-transmitting manner with a corresponding first transmission and reception device 7a that is present in the identification transmitter 2 via the first communication connection 3a. Provision can correspondingly be made in the motor vehicle 1 for a second transmission and reception device 6b that is connected to the control/regulation device in a data-transmitting manner and that can communicate in a data-transmitting manner with a corresponding second transmission and reception device 7b that is present in the identification transmitter 2 via the second communication connection 3b. A first maximum range RM1 of the first communication connection 3a from the motor vehicle 1 to the identification transmitter 2 that is measured from the motor vehicle 1 is shorter than a second maximum range RM2 of the second communication connection 3b from the motor vehicle 1, which is also measured from the motor vehicle 1. The first maximum range RM1 and the second maximum range RM2 are indicated in FIG. 1 by dashed lines. The ranges RM1 and RM2 shown are not depicted to scale.

In the following, the method according to the invention is explained in an exemplary manner with reference to FIG. 1.

The method comprises three measurements a), b) and c).

According to measurement a), a decrease in the signal strength of the second communication connection 3b is monitored while the identification transmitter 2 is moved away from the motor vehicle 1, such that the spacing A between the motor vehicle 1 and the identification transmitter 2 increases. In measurement b), the current signal strength of the second communication connection 3b is stored as a reference value as soon as the maximum range RM1 of the first communication connection 3a is exceeded when the identification transmitter 2 is moved away from the motor vehicle 1. In this case, the first communication connection 3a between the motor vehicle 1 and the identification transmitter 2 is deactivated, while, by contrast, the second communication connection 3b is maintained. The reference value can be established by averaging the signal strength over a pre-determined period of time. This pre-determined period of time can, for example, be between 1 second and 5 seconds, in particular approximately 4.5 seconds. According to measurement c), the deactivated first communication connection 3a is activated again as soon as the signal strength of the second communication connection exceeds the stored reference value again due to the decreasing spacing between the motor vehicle and the identification transmitter when the identification transmitter 2 is moved towards the motor vehicle again.

After the reactivation of the first communication connection 3a carried out in measurement c), in a measurement d) following measurement c), the current spacing A between the identification transmitter 2 and the motor vehicle 1 can be determined by means of the first communication connection 3a. In this case, authorization data can be transmitted, preferably encrypted, from the identification transmitter 3 to the motor vehicle 1 by means of the second communication connection 3b as soon as the spacing A determined in measure d) falls short of a pre-determined minimum value (AMIN). A pre-determined action can also be carried out in the motor vehicle 1 as soon as the spacing A determined in measure d) has fallen short of the pre-determined minimum value AMIN (see FIG. 1). This pre-determined action can, for example, be the unlocking of one of the vehicle doors 4 of the motor vehicle 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for authorizing access to a motor vehicle by a mobile electronic identification transmitter, wherein the vehicle is unlockable by the mobile electronic identification transmitter, wherein the mobile electronic identification transmitter communicates in a data-transmitting manner with the motor vehicle both via a first wireless communication connection, which works with a UWB standard, and via a second wireless communication connection, which works with a BLE standard, wherein a maximum range of the first wireless communication connection is shorter than a maximum range of the second wireless communication connection, the method comprising:
  a) monitoring a decrease in signal strength of the second wireless communication connection, while the mobile electronic identification transmitter is moved away from the motor vehicle, such that a spacing between the motor vehicle and the mobile electronic identification transmitter increases;
  b) storing a current signal strength of the second wireless communication connection as a reference value as soon as the first wireless communication connection between the motor vehicle and the mobile electronic identification transmitter is deactivated or interrupted; and
  c) reactivating the first wireless communication connection so soon as a signal strength of the second wireless communication connection exceeds the stored reference value due to the decreasing spacing between the motor vehicle and mobile electronic identification transmitter when the mobile electronic identification transmitter is moved towards the motor vehicle again.

2. The method of claim 1, wherein the first wireless communication connection is deactivated responsive to a maximum range of the first wireless communication connection being exceeded when the mobile electronic identification transmitter is moving away from the motor vehicle.

3. The method of claim 1, wherein after the reactivation of the first wireless communication connection performed in step c), the method comprises:
  d) determining a current spacing between the mobile electronic identification transmitter and the motor vehicle using the first wireless communication connection.

4. The method of claim 3, wherein authorization data is transmitted from the mobile electronic identification transmitter to the motor vehicle by the second wireless communication connection as soon as the spacing determined in step d) falls short of a pre-determined minimum value.

5. The method of claim 3, wherein at least one pre-determined action is carried by the motor vehicle as soon as the current spacing determined in step d) falls short of the pre-determined minimum value, wherein the at least one pre-determined action comprises or is unlocking of at least one vehicle door of the motor vehicle.

6. The method of claim 1, wherein in step b), the reference value is established by averaging a signal strength over a pre-determined period of time.

7. The method of claim 6, wherein the pre-determined period of time is between 1 second and 5 seconds.

8. The method of claim 1, wherein the mobile electronic identification transmitter is part of a smartphone.

9. A system, comprising:
  a motor vehicle;
  a mobile electronic identification transmitter, which is configured to communicate with the motor vehicle by a first wireless communication connection according to a UWB standard and by a second wireless communication connection according to a BLE standard; and
  a control/regulation device in the motor vehicle configured to
  a) monitor a decrease in signal strength of the second wireless communication connection, while the mobile electronic identification transmitter is moved away from the motor vehicle, such that a spacing between the motor vehicle and the mobile electronic identification transmitter increases;
  b) store a current signal strength of the second wireless communication connection as a reference value as soon as the first wireless communication connection between the motor vehicle and the mobile electronic identification transmitter is deactivated or interrupted; and
  c) reactivate the first wireless communication connection so soon as a signal strength of the second wireless communication connection exceeds the stored reference value due to the decreasing spacing between the motor vehicle and mobile electronic identification transmitter when the mobile electronic identification transmitter is moved towards the motor vehicle again.

10. The system of claim 9, wherein the mobile electronic identification transmitter is part of a smartphone or is formed by the smartphone.

* * * * *